United States Patent
Takaai et al.

(10) Patent No.: US 10,402,594 B2
(45) Date of Patent: Sep. 3, 2019

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventors: Motoyuki Takaai, Yokohama (JP); Masatsugu Tonoike, Yokohama (JP); Mihoko Wakui, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 360 days.

(21) Appl. No.: 15/238,120

(22) Filed: Aug. 16, 2016

(65) Prior Publication Data

US 2017/0249482 A1 Aug. 31, 2017

(30) Foreign Application Priority Data

Feb. 29, 2016 (JP) .................. 2016-037390

(51) Int. Cl.
*H04L 9/32* (2006.01)
*G06F 21/64* (2013.01)

(52) U.S. Cl.
CPC .......... *G06F 21/645* (2013.01); *H04L 9/3236* (2013.01); *H04L 9/3247* (2013.01); *H04L 9/3263* (2013.01); *H04L 9/3297* (2013.01); *H04L 2209/38* (2013.01)

(58) Field of Classification Search
CPC ... H04L 9/3236; H04L 9/3297; H04L 9/3247; H04L 9/3263; H04L 2209/38; G06F 21/645
USPC .......................................................... 713/178
See application file for complete search history.

(56) References Cited

U.S. PATENT DOCUMENTS

| | | | |
|---|---|---|---|
| 9,679,276 B1 † | 6/2017 | Cuende | |
| 2008/0097753 A1 | 4/2008 | Oura | |
| 2016/0098730 A1 † | 4/2016 | Feeney | |

FOREIGN PATENT DOCUMENTS

| | | |
|---|---|---|
| JP | 2002-215029 A | 7/2002 |
| JP | 3475145 B2 | 12/2003 |
| JP | 2005-045486 A | 2/2005 |
| WO | 2006/054754 A1 | 5/2006 |

† cited by third party

*Primary Examiner* — Kambiz Zand
*Assistant Examiner* — Benjamin A Kaplan
(74) *Attorney, Agent, or Firm* — Oliff PLC

(57) ABSTRACT

There is provided an information processing apparatus. An acquisition unit acquires feature information of a latest block in a block chain when target data is generated. A registration unit registers proof information indicating that the generated target data is correlated with the feature information acquired by the acquisition unit when the target data is generated to a time proof service.

7 Claims, 6 Drawing Sheets

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-037390 filed Feb. 29, 2016.

TECHNICAL FIELD

The present invention relates to an information processing apparatus and a non-transitory computer readable medium.

RELATED ART

Since digital data can be copied and edited, the digital data cannot be used as an evidence as it is.

A time stamp technique, for example, is widely known as a technique for allowing digital data to be used as an evidence. For example, according to a time stamp protocol defined by RFC 3161, a user sends the hash value of digital data to a time stamp authority (TSA). The time stamp authority combines present time information with the hash value to obtain combined data, performs digital signature based on public key infrastructure (PKI) on the combined data to generate a time stamp token, and returns the time stamp token to the user. By verifying the digital signature of this token, it is possible to verify that the digital data is present at the time point at which the digital data is included in the token and the digital data is not falsified after that time point.

Moreover, proof of existence (https://www.proofofexistence.com/) is known as a service which can verify the existence of document data at a certain time point regardless of a single authentication system like the time stamp authority. This service registers a block corresponding to the document data to a block chain used for recording the transaction history in the Bitcoin to thereby enable the proof of existence of the document data. The one who can register a block to the block chain is a person who first succeeds in the process of computing the proof of work among plural nodes called "miners" who are present on a peer-to-peer (P2P) network. Thus, the reliability of the block chain depends on the reliability of the block chain structure itself rather than the reliability of a central system.

SUMMARY

According to an aspect of the embodiments of the present invention, there is provided an information processing apparatus comprising: an acquisition unit that acquires feature information of a latest block in a block chain when target data is generated; and a registration unit that registers proof information indicating that the generated target data is correlated with the feature information acquired by the acquisition unit when the target data is generated to a time proof service.

BRIEF DESCRIPTION OF THE DRAWINGS

Exemplary embodiments of the present invention will be described in detailed based on the following figures, wherein.

DETAILED DESCRIPTION

A device according to an exemplary embodiment of the present invention will be described with reference to FIG. 1.

Figure 1:
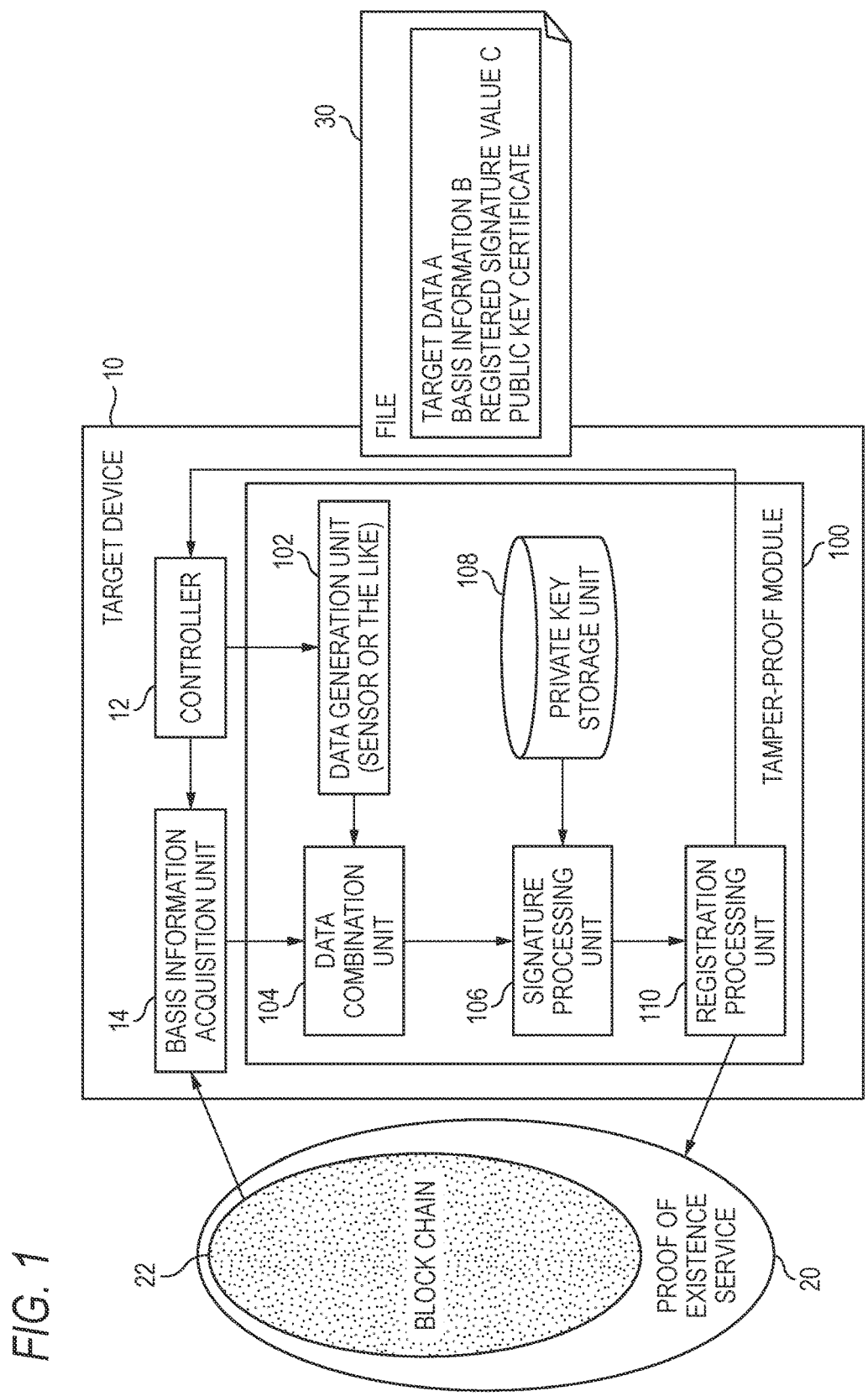
FIG. 1 is a diagram illustrating an example of a system configuration according to an exemplary embodiment.

A target device 10 illustrated in FIG. 1 is a device to which a method of the present exemplary embodiment is applied. The target device 10 generates data and executes a process for enabling the generation time of the data to be proved. When it is possible to prove that the data is not present before a certain time point T1 and the data is present at a time point T2 later than that time point T1, it can be proved that the "generation time" of the data is in a period between the time points T1 and T2. For this proof, a block chain 22 is used in the present exemplary embodiment.

The block chain 22 is a distributed ledger system used in a virtual money transaction system called Bitcoin or a distributed ledger system equivalent thereto.

The Bitcoin is a peer-to-peer (P2P) system in which several pieces of transaction information are stored in blocks and these blocks are written on a P2P network in a distributed manner. Blocks form a chain structure in a time-sequential order. Since each block contains a hash value of a previous block, it is very difficult to falsify the block chain. Plural nodes called miners are present on the P2P network, and transaction information generated by a sender of money is broadcasted to these miners. Among these miners, a person who first solves a computation called proof of work adds a block that stores pieces of transaction information issued in a previous predetermined period to the block chain and obtains a reward for the addition. The proof of work is a computation of adjusting a value called a nonce included in a block to be added to the block chain to obtain a hash value that satisfies a specific condition (for example, a designated number or more of 0 are located at the start of a hash value) as the hash value of the block. In the Bitcoin, the specific condition is managed so that a theoretical time required for computing the hash value is 10 minutes. Thus, a new block is added to the block chain every approximately 10 minutes. Since the hash value of a newly added block is obtained after a person succeeds in computing the hash value of the previous block or the proof of work with respect to a group of pieces of transaction information generated after the previous block is added, it is not substantially possible to predict the hash value in advance. Moreover, a specific management entity of the block chain is absent, the reliability of the block chain is not based on the reliability of such a specific management entity but is based on the fact that the structure itself that prevents falsification like the proof of work has stochastically high reliability.

While the block chain of the Bitcoin has been described briefly, the block chain 22 is not limited thereto but the block chain of another system may be used. Besides the Bitcoin, a system which employs the block chain that uses the structure of the proof of work is present. Moreover, a block chain that uses another consensus algorithm such as the proof of stake instead of the proof of work is also present. In the other consensus algorithm such as the proof of stake, it is possible to make it difficult to predict the hash value of a block in advance and to guarantee the reliability of the system independently from a specific management entity.

A proof of existence service 20 is a service that receives a proof of existence request for data from a user and performs a process for the proof of existence according to the request. The proof of existence service 20 registers target data (or feature information of the data) of the proof of existence request from the user to the block chain 22 so that the time point at which the data is present can be proved. The proof of existence is a specific example of the proof of existence service 20. In this example, the proof of existence service 20 can be understood as a group of miner nodes who add blocks to the block chain 22. When the proof of existence service 20 is the proof of existence, the block chain 22 is the block chain of the Bitcoin. The proof of existence is an example only. Another service that uses the block chain of the Bitcoin or another service that uses the block chain other than the Bitcoin may be used as the proof of existence service 20.

Returning to description of the target device 10, the data generated by the target device 10 is not particularly limited. For example, the target device 10 may be a device that generates image (still-image) data or video data like a digital camera and may be a device that generates audio data like a voice recorder. Moreover, the target device 10 may be a device such as a smartphone having both an image capturing function and a voice recording function. Further, the target device 10 may be a device that generates data other than images or audio data such as physical measurement data such as position, velocity, and acceleration or chemical measurement data such as concentration.

A controller 12 is a system that controls an overall operation of the target device 10. For example, when the target device 10 is a digital camera, the controller 12 executes a user interface process of receiving instructions such as capturing conditions and shutter-press, a process of controlling the operations of respective units of the target device 10 according to these instructions, and a process of storing captured images in an internal storage or the like. The control process executed by the controller 12 depends on the type of the target device 10.

The controller 12 has a function of instructing a tamper-proof module 100 to generate data of which the existence can be proved and a function of instructing a basis information acquisition unit 14 to acquire basis information in addition to a general control operation corresponding to the type of the target device 10.

Typically, the controller 12 is realized by a central processing unit (CPU) executing a control program.

The basis information acquisition unit 14 acquires the feature information of a latest block included in the block chain 22 as the basis information according to an acquisition instruction from the controller 12. The feature information of a block is the hash value of the block, for example. As described above, the hash value of a block is a value which substantially cannot be predicted by the time point at which the block is added to the block chain 22. Moreover, another information other than the hash value may be used as the feature information of a block. For example, the nonce value in a block may be used as the feature information of the block since the nonce is a value which substantially cannot be predicted until the block is added to the block chain 22 like the hash value. If the nonce only may cause a coincidence, a set of the nonce and another information in the block (for example, a time stamp or the start of transaction information) may be used as the feature information of the block. In the present exemplary embodiment, the feature information acquired by the basis information acquisition unit 14 is used as the "basis information" for specifying the time point before the target data of the proof of existence is present. In the following description, a case in which the hash value of a latest block of the block chain 22 is used as the basis information will be described as a representative example.

The basis information acquisition unit 14 acquires the feature information (for example, the hash value) of the latest block from the block chain 22 using an application program interface (API) for operations of the block chain 22, for example. The basis information acquisition unit 14 is realized by the CPU executing an acquisition processing program, for example.

In the example of FIG. 1, although the basis information acquisition unit 14 is provided outside the tamper-proof module 100, the basis information acquisition unit 14 may be provided in the tamper-proof module 100. When the basis information acquisition unit 14 is provided in the tamper-proof module 100, the possibility that falsification occurs in the stage of acquiring the feature information of blocks is reduced.

The tamper-proof module 100 is a module having tamper-proof properties. Hardware components that form respective processing units such as a data generation unit 102 and a private key storage unit 108 in this module, software components, and data held by these hardware components cannot be accessed, analyzed, and modified unless the outer package of the module and individual packages of the hardware components are destroyed. The tamper-proof module 100 is not limited to this type of tamper-proof properties but may have another type of tamper-proof properties (for example, such tamper-proof properties that internal data (for example, a private key) is deleted when destruction of the package is detected)). Since the processing units such as the data generation unit 102 and the private key storage unit 108 are protected by the tamper-proof module 100, falsifications of replacing the data generated by the data generation unit 102 with another data and steeling the private key in the private key storage unit 108 are not practically possible.

Processing units including the data generation unit 102, a data combination unit 104, a signature processing unit 106, the private key storage unit 108, and a registration processing unit 110 are provided in the tamper-proof module 100. In addition to providing the tamper-proof module 100 with tamper-proof properties, the respective processing units such as the data generation unit 102 in the module may individually have tamper-proof properties.

The data generation unit 102 is a mechanism that generates target data of the proof of existence. Typically, the data generation unit 102 is a sensor that converts physical or chemical stimuli to electrical signals and outputs the signals as data. For example, a CCD imaging element of a digital camera, a microphone of a voice recorder, and the like are specific examples of the data generation unit 102.

The data combination unit 104 combines data (hereinafter referred to as "target data") which is the target of the proof of existence, generated by the data generation unit 102 and the basis information (the hash value of a latest block) acquired by the basis information acquisition unit 14 in correlation with the generation to generate combined data. A method of combining both pieces of data is not particularly limited. For example, a simple combination method that a text representation of the basis information is added to the end of a text representation of the target data may be used. The combination method used by the data combination unit 104 is made open so that a device (for example, a program that checks the generation time of the target data) other than the target device 10 can use the combination method.

The private key storage unit 108 stores a private key unique to the target device 10 in a public key method. The private key is protected so as not to be revealed outside the tamper-proof module 100. A public key corresponding to the private key may be output to the outside of the tamper-proof module 100, for example, in the form of being included in a public key certificate and may be registered in and retrieved from a public database.

The signature processing unit 106 computes a digital signature using the private key in the private key storage unit 108 with respect to the combined data output from the data combination unit 104. That is, the signature processing unit 106 computes the hash value of the combined data, for example, and encrypts the computed hash value using the private key to thereby obtain a signature value of the digital signature. Since this signature value is a value obtained from the combined data obtained by combining the target data and the basis information, the signature value can be used as a value for proving that the target data and the basis information are correlated with each other. For example, when target data, basis information, and a signature value are obtained, and combined data is generated from the target data and the basis information, if a value obtained by decrypting the signature value using the public key is identical to the combined data or a hash value of the combined data, it can be determined that the target data, the basis information, and the signature value are correlated with each other. When the target device 10 is configured to generate target data having a small data amount, the signature processing unit 106 may compute the signature value by directly encrypting the combined data using the private key rather than obtaining the hash value of the combined data.

The registration processing unit 110 executes a process for registering the signature value obtained by the signature processing unit 106 to the proof of existence service 20. The registration processing unit 110 transmits transaction information including the signature value to the proof of existence service 20, for example, using the API of the proof of existence service 20 (for example, the transaction information is broadcasted to a group of miners). The transmitted transaction information is added to the block chain 22 in the form of being included in a latest block by a miner who win at the proof of work. A time stamp indicating the time point at which the latest block is added is later in time than the generation of the target data which is the source of the signature value. Thus, the time stamp indicates the time point at which the target data i already present.

A case in which registration of the transaction information to the proof of existence service 20 fails may occur. In this case, the target data may be discarded and an entire registration process may be cancelled. Alternatively, the transaction information may be transmitted repeatedly until the registration succeeds.

Moreover, when it is possible to register the transaction information including the signature value to the proof of existence service 20, the registration processing unit 110 outputs the target data and various pieces of information used for checking the generation time of the target data to the controller 12. The various pieces of information used for checking the generation time of the target data include a signature value and basis information (the information that the basis information acquisition unit 14 acquired from the block chain 22) which is the source of the signature value. In the example illustrated in FIG. 1, the registration processing unit 110 outputs one file 30 in which target data A, basis information B, a signature value C, and a public key certificate corresponding to the private key used for computing the signature value C are packaged to the controller 12. This file 30 is a response to the controller 12 with respect to a data generation and registration instruction from the controller 12. The controller 12 stores the received file 30 to an internal storage or the like of the target device 10.

Next, the flow of a data generation and registration process executed by the target device 10 will be described with reference to a specific example illustrated in FIG. 2.

Figure 2:
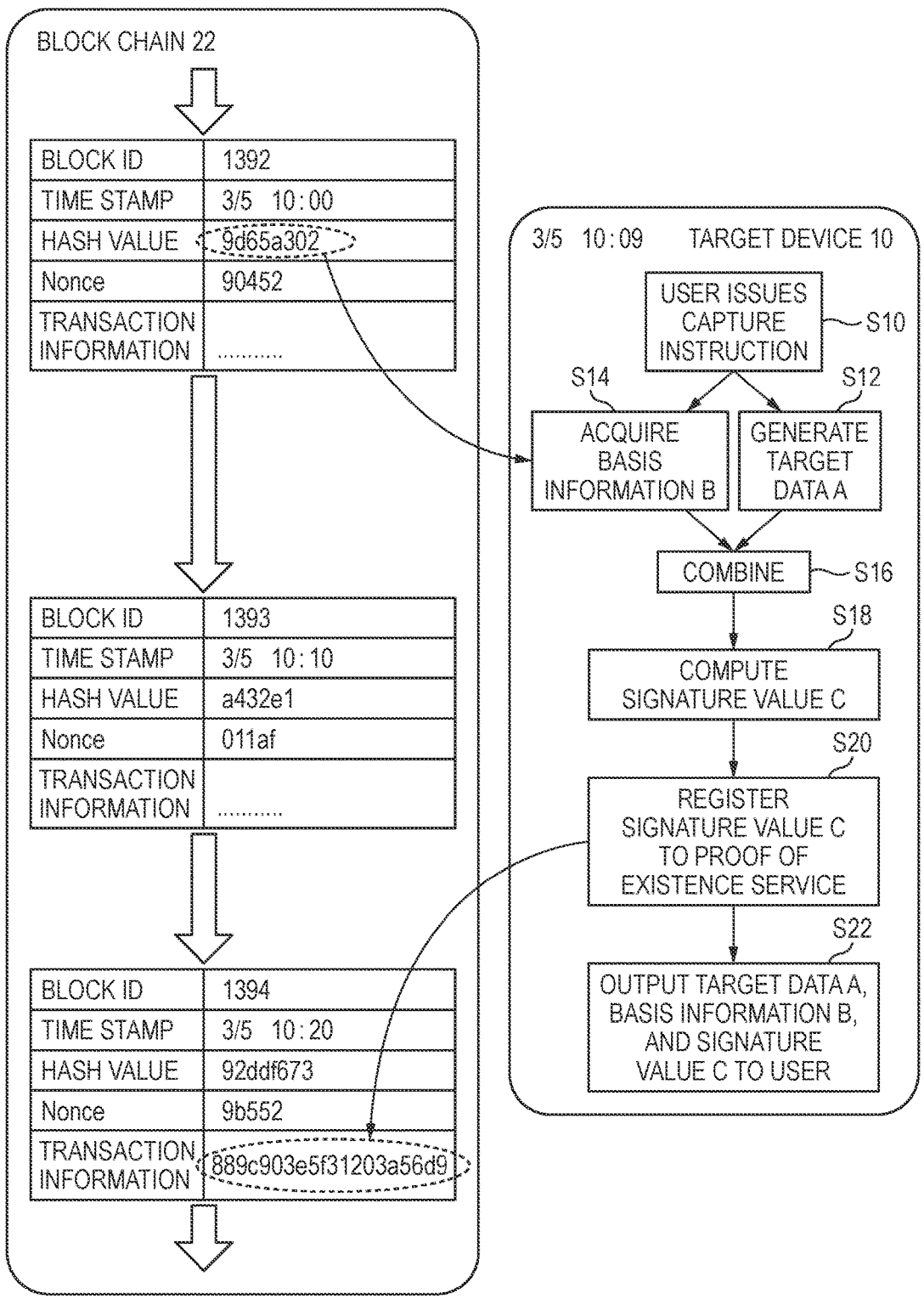
FIG. 2 is a diagram for describing an example of the flow of processes executed by a target device.

In the example illustrated in FIG. 2, a new block is added to the block chain 22 every 10 minute, and at the time point of 3/5 10:00 (month/day hh:mm), a block (that is, a latest block) at the end of the block chain 22 is a block having a block ID (identifier) of "1392". In this example, each block in the block chain 22 includes a block ID, a time stamp, a hash value, a nonce, and transaction information. The time stamp indicates the time at which this block is generated (and is added to the block chain 22). The hash value is the hash value of the block and is a hash value that satisfies specific conditions, specified by the process such as the proof of work as described above. The nonce is a value used for obtaining the hash value that satisfies the specific conditions in the process such as the proof of work. The transaction information is information indicating the content of a transaction occurred after a block immediately before the block is generated as described above. Although the block includes other information such as the hash value of the previous block, the information is not illustrated.

At the time point of 3/5 10:09, it is assumed that a user presses a shutter button of the target device 10 (in this case, a digital camera) and issues a capture instruction (S10). The controller 12 having received the instruction instructs the data generation unit 102 to generate data (that is, capture an image) and instructs the basis information acquisition unit 14 to acquire basis information. Here, the controller 12 issues the capture instruction to the data generation unit 102 and the acquisition instruction to the basis information acquisition unit 14 in correlation with a certain temporal relation. This certain temporal relation is such a relation that both instructions are issued substantially "simultaneously", for example. From the purpose of using the basis information (that is, in order to prove the time point at which target data is not yet present), it is assumed that the acquisition instruction is issued to the basis information acquisition unit 14 simultaneously with or slightly before or after the capture instruction is issued.

A configuration which takes the possibility that the controller 12 is falsified into consideration may be considered. In this configuration, the basis information acquisition unit 14 is incorporated into the tamper-proof module 100. Upon receiving a capture instruction from the controller 12, a control program executed by a processor in the tamper-proof module 100 issues an operation instruction to the data generation unit 102 and the basis information acquisition unit 14 with a certain temporal relation. The control program is stored in the tamper-proof module 100, it is difficult to falsify the temporal relation between the capture instruction and the basis information acquisition instruction.

The data generation unit 102 having received the capture instruction performs a capture process and generates image data as the target data A (S12). Moreover, the basis information acquisition unit 14 having received the acquisition instruction acquires the hash value which is the feature information of the latest block from the block chain 22 as the basis information B (S14). At this acquisition time point (3/5 10:09), since the latest block of the block chain 22 is a block having the block ID of "1392", a hash value "9d65a302" of the block "1392" is acquired as the basis information B.

The data combination unit 104 combines the generated target data A and the acquired basis information B to generate combined data (S16). The signature processing unit 106 computes the signature value C of the digital signature of the combined data using the private key of the target device 10 (S18). For example, the signature processing unit 106 computes the hash value of the combined data and encrypts the hash value using the private key to obtain the signature value.

When the signature value C is computed, the registration processing unit 110 includes the signature value C in a predetermined item within the transaction information that the user can freely use, for example, to the proof of existence service 20 (S20). Subsequently, a miner who first solves the computation of the proof of work in the proof of existence service 20 adds a block including the transaction information to the end of the block chain 22.

In the illustrated example, the transaction information including the signature value C is not registered within the period until a block "1393" subsequent to the block "1392" which is the source of the basis information B is generated, but the transaction information is registered in a still later block "1394". A value "889c903e5f31203a56d9" included in the item of the transaction information within the block "1394" is the signature value C obtained in S18. In FIG. 2, the signature value C only within one piece of transaction information is illustrated in the item of the transaction information of a block for the sake of simplicity, an item other than the signature value C may be included in the transaction information and plural pieces of transaction information may be included in the item. When a process for registering the transaction information including the signature value C is executed earlier until the subsequent block "1393" is generated, the transaction information is registered in the block "1393".

When the transaction information transmitted by the registration processing unit 110 in step S20 is properly received by the proof of existence service 20, the registration processing unit 110 outputs the target data A, the basis information B, and the signature value C generated immediately previously to the controller 12 in correlation (for example, by packaging them to one file) (S22). The controller 12 stores the output data in an internal storage or transmits the same to a predetermined server and stores the same in the server.

By the process described above, information capable of specifying the generation time of the target data A generated by the target device 10 is registered in the block chain 22. That is, the target data A is present at the time point at which the transaction information transmitted from the target device 10 to the proof of existence service 20 in step S20 is registered in the block chain 22 (that is, the time stamp "3/5 10:20" of the block "1394" including the transaction information). Thus, the time stamp can be used as the end T2 of the generation time. Moreover, the signature value C is included in the transaction information, and the signature value C originates from the combined data of the target data A and the basis information B. Thus, a person who obtains the target data A, the basis information B, and the signature value C can verify the signature value C using the open public key of the target device 10. When the signature value C is verified correct, it is possible to check that the target data A is generated by the target device 10 corresponding to the public key and the target data A and the basis information B acquired together with the signature value C are not falsified. Since the basis information B is information (hash value) in the block "1392" in the block chain 22, the basis information B can be retrieved from the block chain 22. Since the block "1392" is already present at the time point at which the user issues a capture instruction to the target device 10, the target data A is not yet present at the time point indicated by the time stamp "3/5 10:00" of the block. Thus, the time stamp can be used as the start T1 of the generation time. In this manner, by using the registration information of the block chain 22, it is possible to check that the target data A has been generated in a period between the time points T1 and T2.

Further, the fact that each block in the block chain 22 is correct is guaranteed by a protocol which forms the basis of the block chain 22 called the proof of work, the proof of stake, or the like. That is, even if a specific reliable management entity is not present, it is possible to believe that the information acquired from the block chain 22 is correct.

In this example, since a block chain of the Bitcoin to which blocks are added every 10 minutes is used, the limit of the width of the generation time of target data is approximately 10 minutes which is the time width of these blocks. However, the specifiable width of the generation time may be shortened further using the block chain 22 to which blocks are added at shorter intervals.

In the example of FIG. 2, although the generation (S12) of the target data A and the acquisition (S14) of the basis information B are performed using the capture instruction issued by the user as a trigger, the trigger of steps S12 and S14 is not limited to the instruction from the user. For example, when the target device 10 is a device (for example, a monitor camera) that generates target data (for example, images captured by the monitor camera) at timings determined automatically according to predetermined conditions, the arrival of the generation timings determined automatically is used as the trigger of steps S12 and S14.

Next, an example of the flow of the process of checking the generation time of the target data A generated by the target device 10 will be described with reference to FIG. 3. This process can be implemented as an application program which can be executed by a computer such as, for example, a personal computer or a smartphone or a part thereof.

In this process, first, a computer acquires the target data A, the basis information B, and the signature value C corresponding to the target data A (S30). When the computer has obtained the file 30 (see FIG. 1) output by the target device 10, it is possible to acquire all pieces of the data from the file 30.

Subsequently, the computer verifies the acquired signature value C (S32). In this verification process, the target data A and the basis information B are combined according to the same combination method as used by the data combination unit 104 of the target device 10 to generate combined data, and a hash value D of the combined data is computed. On the other hand, the computer decrypts the signature value C using the public key of a signer. The public key used herein is included in the file 30. Alternatively, since information on a signer who signs the signature value C is associated with the signature value C in the file 30 and the information on the public key is public on a network, the public key corresponding to the signer may be acquired from the network. Moreover, when a value E obtained by decrypting the signature value C is identical to the hash value D of the combined data, it is determined that the signature value C is correct (verification succeeds).

When the verification of the signature value C in step S32 fails, error processing is executed (S33).

On the other hand, when the verification of the signature value C succeeds, the computer acquires the value of the time stamp of a block (that is, the block of which the hash value is identical to the value of the basis information B) which includes the basis information B as the "hash value" from the block chain 22 (S34). This value is the start T1 of the generation time of the target data A. Moreover, the computer acquires a block which includes the signature value C as transaction information from the block chain 22 and acquires the value of the time stamp of the acquired block (S36). This value is the end T2 of the generation time of the target data A. Moreover, the computer presents the user with information indicating that the target data A is generated within the period between the time points T1 and T2 (S38).

In the above-described example, the target device 10 registers the signature value C obtained from the hash value of the combined data obtained by combining the target data A and the basis information B to the proof of existence service 20 (the block chain 22) (S20 in FIG. 2). However, this is an example only. In step S20 in FIG. 2, the combined data itself or the hash value of the combined data instead of the signature value C may be registered to the proof of existence service 20 (the other steps are the same as those of FIG. 2). When the combined data itself or the hash value of the combined data is registered, in the process (see FIG. 3) of checking the generation time of the target data A, in S36, a block which includes the combined data obtained in the signature verification (S32) or the hash value of the combined data as the transaction information may be acquired from the block chain 22. The other steps may be the same as those illustrated in FIG. 3.

It is not always necessary to prove the generation time of all pieces of target data generated by the target device 10. If some of the generated target data does not require verification of the generation time and some requires verification of the generation time, the controller 12 may obtain, from the user, a designation as to whether verification of the generation time is required or not when an instruction to generate the target data is received from the user, for example, and cause the tamper-proof module 100 to execute the above-described process when it is designated that verification of the generation time is required. Moreover, when it is designated that verification of the generation time is not required, the controller 12 may not cause the basis information acquisition unit 14, the data combination unit 104, the signature processing unit 106, and the registration processing unit 110 to execute the process for registering data to the proof of existence service 20 but may cause the data generation unit 102 to generate target data only.

<Modification 1>

In the above-described example, in the proof of existence service 20 in which the registration processing unit 110 registers the signature value C (or the combined data or the like), the signature value or the like is registered in the block chain 22 which is the source of the basis information B that defines the time at which the target data is not yet present. In this method, it is sufficient that a unit in the target device 10, for proving the generation time of the target data A corresponds to the protocol of the block chain 22. However, this method is an example only.

Figure 4:
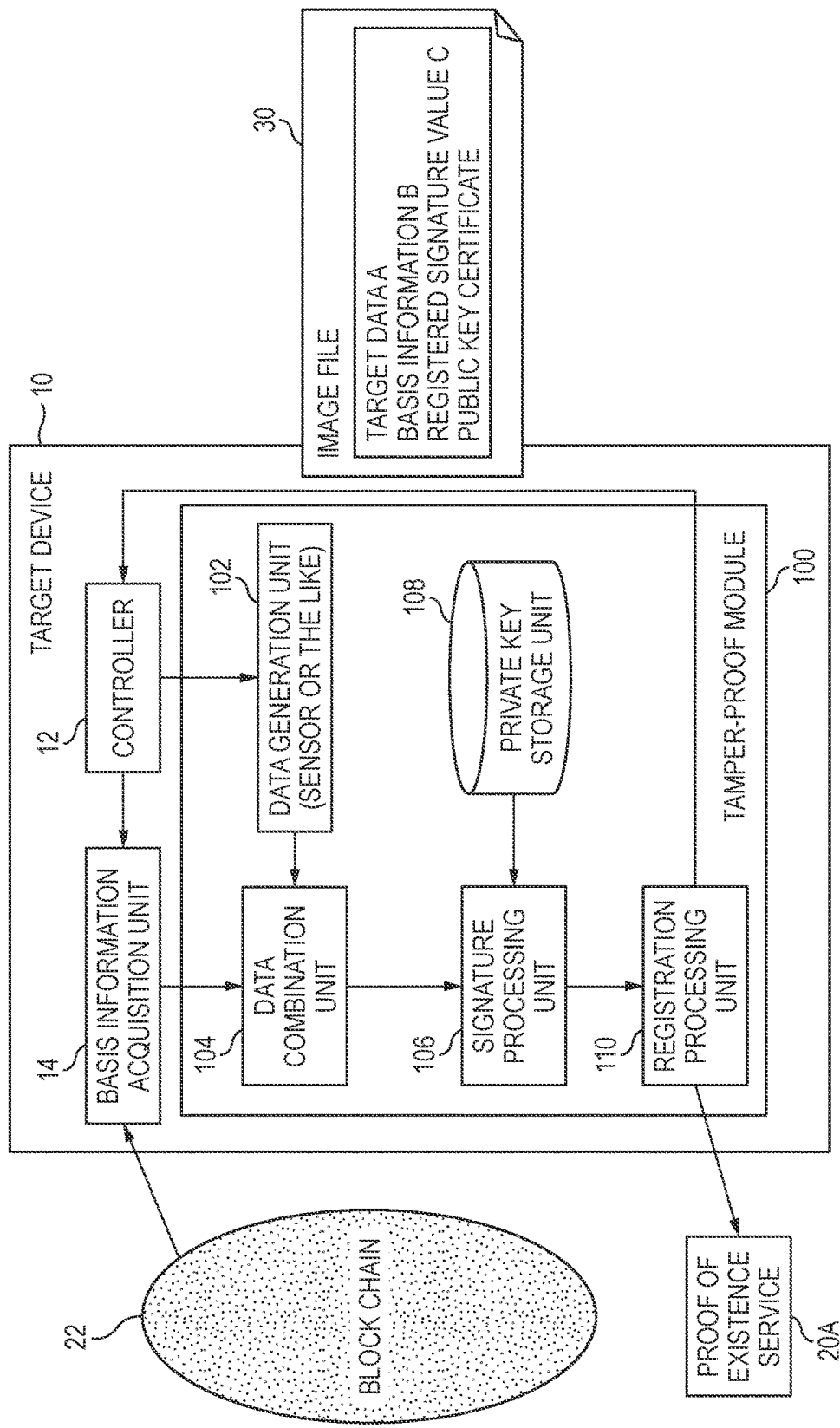
FIG. 4 is a diagram illustrating an example of a system configuration according to Modification 1.

Instead of this, as illustrated in FIG. 4, a proof of existence service 20A which does not use the block chain 22 which is the source of the basis information B may be used. In this example, the proof of existence service 20A records information such as the signature value C received from the target device 10 in correlation with the reception time according to the method of the proof of existence service 20A itself. The proof of existence service 20A may be a service that registers the signature value C or the like to another block chain other than the block chain 22 and may be a service that registers the signature value C or the like to a database unique to the service other than the block chain.

Figure 3:
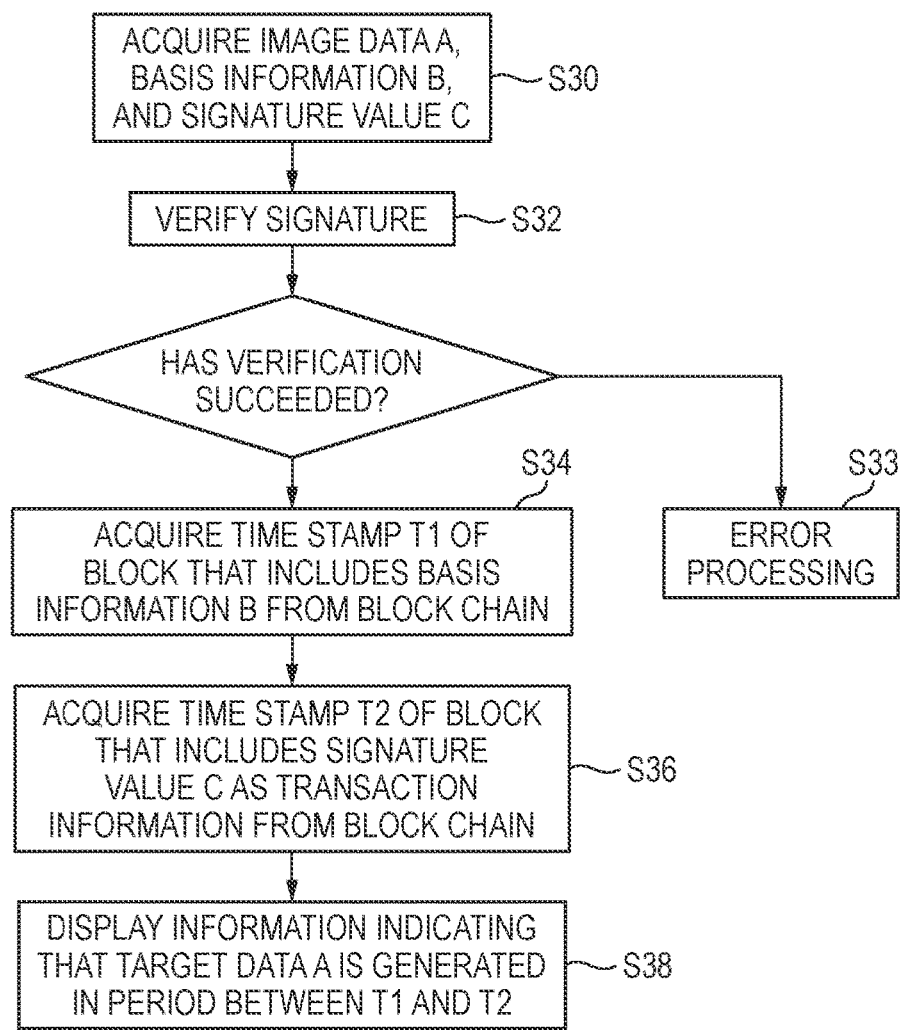
FIG. 3 is a diagram for describing an example of the flow of processes executed by a device that checks the generation time of target data.

Although a device that checks the generation time of the target data A may acquire the basis information B from the block chain 22 similarly to FIG. 1 in step S34 among the flow of FIG. 3, the device may acquire information on the time point T2 at which the signature value C or the like is registered from the proof of existence service 20A in step S36. This time point T2 is not information in the block chain 22 but is information separate from the information, guaranteed by the proof of existence service 20A.

In the modification of FIG. 4, the basis information B that specifies the time point at which the target data A is not yet present can be obtained from the block chain 22 in which the reliability of registered information is guaranteed even when there is no reliable specific management entity.

<Modification 2>

In the configuration of the exemplary embodiment, the private key stored in the private key storage unit 108 is protected from an illegitimate access from the outside by the tamper-proof module 100 or the like. However, since the private key in the private key storage unit 108 is written by a manufacturer of the target device 10, the private key may be revealed to the outside of the target device 10 or not depending on the manufacturer. That is, when the private key is revealed from the manufacturer or the private key is misused illegally by the manufacturer itself, another device different from the target device 10 can use the same private key to generate an electronic signature of the target device 10 from false data.

Figure 5:
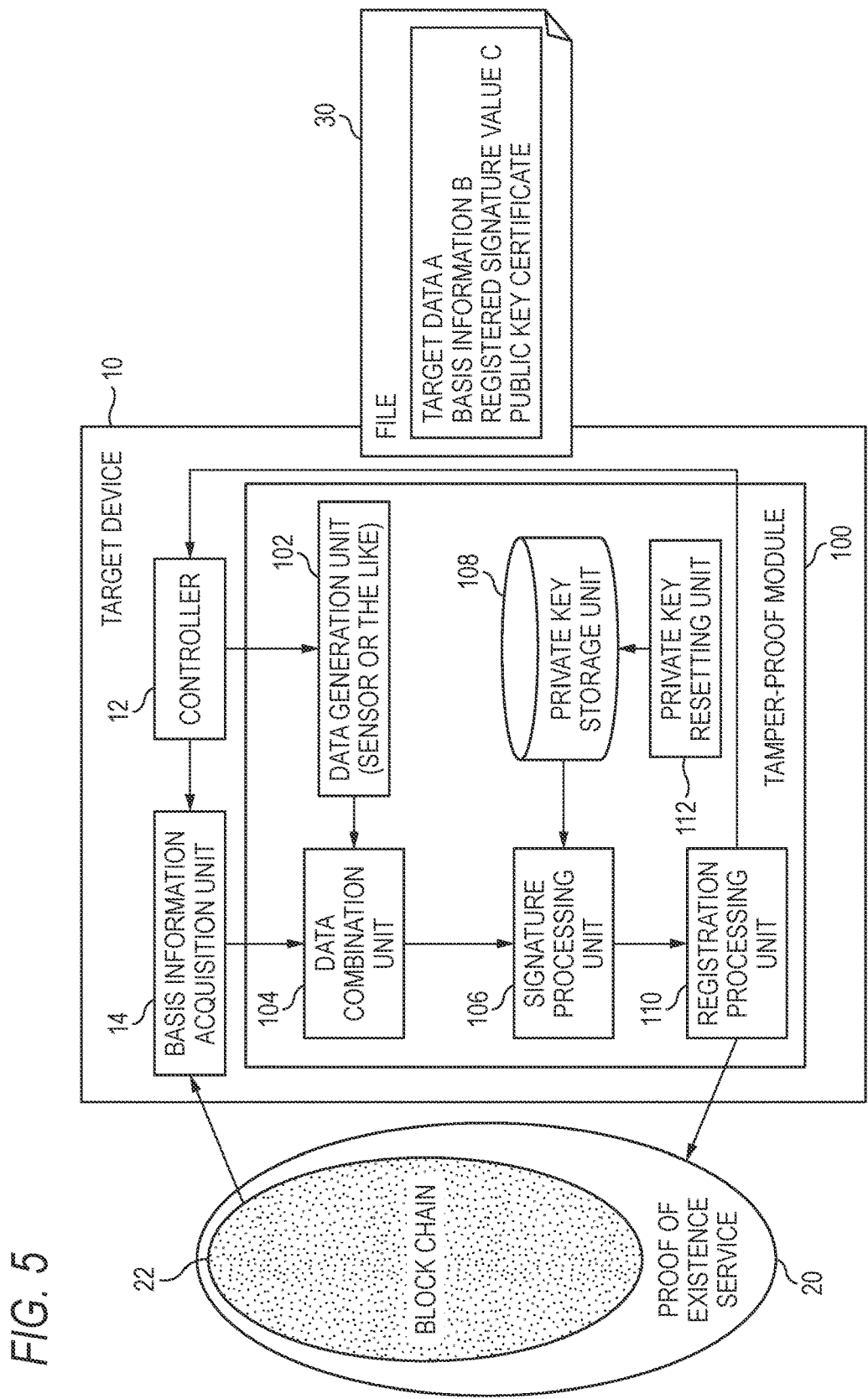
FIG. 5 is a diagram illustrating an example of a system configuration according to Modification 2.

As a method of preventing such a type of spoofing, a method of allowing the user of the target device 10 to reset the private key held in the private key storage unit 108 at an arbitrary timing may be considered. That is, as illustrated in FIG. 5, a private key resetting unit 112 is provided in the target device 10 so that, when a user instructs the target device 10 to reset the private key, the private key resetting unit 112 generates a random number and use the random number as the private key. Here, a pseudo random number which uses the data, time, or the like generated by an internal sensor for example, (included in the data generation unit 102) as its seed is used as the random number so that a private key generation method cannot be estimated from the outside. The private key resetting unit 112 replaces the private key generated at that time with the existing private key in the private key storage unit 108 and sets information of a public key corresponding to the private key to the registration processing unit 110 and the like (alternatively, acquires a public key certificate for the public key and sets the public key certificate to the registration processing unit 110) so that the information of the public key is included in the file 30 output by the target device 10. In the example of FIG. 5, since the private key resetting unit 112 is provided in the tamper-proof module 100, the resetting of the private key itself is protected from the outside.

In FIG. 5, although a case in which the proof of existence service 20 which uses the block chain 22 is used has been illustrated, the configuration of Modification 2 can be applied to a case in which the proof of existence service 20A which does not use the block chain 22 illustrated in Modification 1 is used. The configuration of Modification 2 can be also applied to Modification illustrated below.

<Modification 3>

Here, although the private key resetting unit 112 of Modification 2 described above generates a random number according to a user's instruction and sets the random number as the private key, the user does not know whether the private key resetting unit 112 has really generated the random number. For example, a manufacturer can manufacture the private key resetting unit 112 so that a "random number" desired by the manufacturer itself is generated. In this case, the manufacturer can obtain the same private key as the private key of the target device 10 to do spoofing on the private key. In the following example, a method of detecting spoofing which uses the same private key as the private key stored in the private key storage unit 108 will be proposed.

Figure 6:
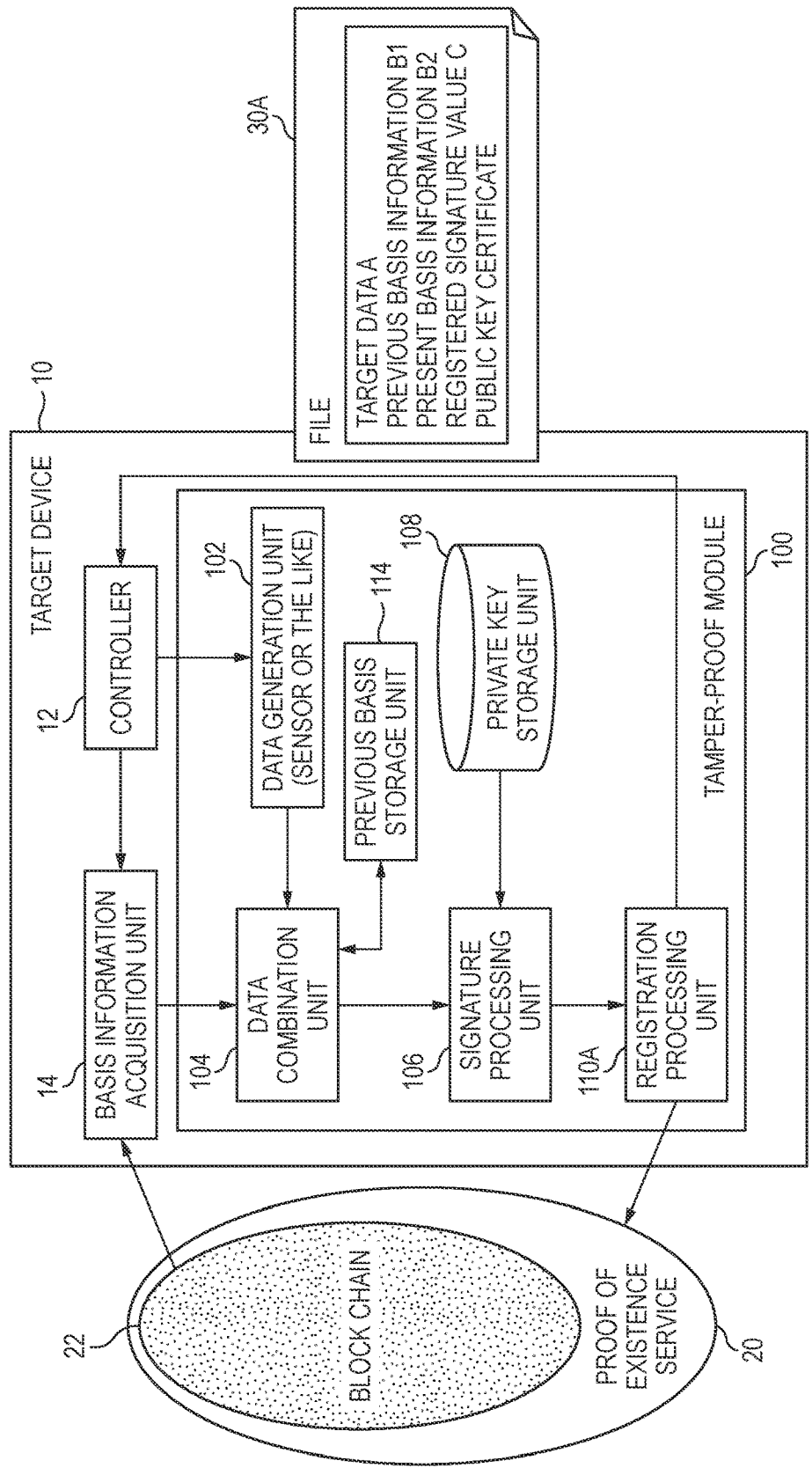
FIG. 6 is a diagram illustrating an example of a system configuration according to Modification 3.

In this method, as illustrated in FIG. 6, a previous basis storage unit 114 is provided in the target device 10. The previous basis storage unit 114 is a mechanism that stores the basis information acquired by the basis information acquisition unit 14 with respect to the previously generated target data and is configured as a storage device such as a flash memory capable of maintaining the stored content even if power is off. The data combination unit 104 combines the target data A generated presently by the data generation unit 102, the present basis information B2 acquired by the basis information acquisition unit 14 in correspondence with the target data A, and the previous basis information B1 stored in the previous basis storage unit 114 to generate combined data. The signature processing unit 106 performs electronic signature using the private key with respect to the combined data to obtain the signature value C, and the registration processing unit 110A registers the signature value C to the proof of existence service 20. After this registration process, the registration processing unit 110A outputs a file 30A including the target data A, the previous basis information B1, the present basis information B2, the signature value C, and the public key certificate to the controller 12. After the signature value is registered to the proof of existence service 20, the data combination unit 104 overwrites the present basis information B2 into the previous basis information B1 in the previous basis storage unit 114. In this way, the presently acquired basis information B2 is reflected on the signature value C and the file 30A as the "previous basis information B1" with respect to the target data A generated subsequently.

In this manner, in Modification 3, the previous basis information B1 as well as the present basis information B2 are reflected on the signature value C registered to the proof of existence service 20 and the information (the file 30A) correlated with the output target data A. As a result, for example, when two or more files 30A which have the same previous basis information B1 but different present basis information B2 are found in the world, it can be determined that there is a possibility of spoofing which uses the same private key as the private key in the target device 10.

That is, a person who does spoofing using the same private key prepares another device that performs the same processing as the target device 10, obtains the file 30A output by the legitimate target device 10, stores the present basis information a in the file 30A in the previous basis storage unit 114 of the other device, and starts using the device. Since the basis information a originates from the legitimate target device 10, the creditability of the data that the device of the spoofer registers to the proof of existence service 20 increases. When the device of the spoofer, having such a configuration generates new data and registers the data to the proof of existence service 20, a file 30A which includes the basis information a originating from the target device 10 as the previous basis information B1 and further includes newly acquired present basis information B2 is generated and output.

On the other hand, when the legitimate target device 10 generates subsequent target data, a file 30A which includes the basis information a as the previous basis information B1 and includes the basis information newly acquired at the time of generation of the target data as the present basis information B2 is generated. As a result, two files which include the same basis information a exist in the world. Since such a situation does not occur unless a spoofer is present, when such a situation occurs, there is a possibility that a spoofer having the same private key as the private key in the target device 10 is present.

Moreover, in a configuration in which the previous basis information B1 and the present basis information B2 as well as the signature value C are registered collectively to the proof of existence service 20, even when all files 30A circulating in the world are not monitored, it is possible to detect plural pieces of data having the same previous basis information from the information registered to the proof of existence service 20.

Whether the previous basis information B1 and the present basis information B2 in the file 30A (or the information registered to the proof of existence service 20) are correct values (values which are not falsified) can be verified by the signature value C corresponding to these pieces of information.

In the configuration which does not use the previous basis information like the exemplary embodiment illustrated in FIG. 1, since there is no easy-to-detect mark that the target data generated by the legitimate target device 10 and the data generated by the device of the spoofer are correlated with the same "previous basis information", it is difficult to detect spoofing.

The target device 10 illustrated and described hereinabove is realized when a computer executes a program for realizing the functions of the respective devices. Here, the computer has a hardware circuit configuration in which a microprocessor such as a CPU, a controller that controls a memory (primary storage) such as a random access memory (RAM) and a read only memory (ROM) and a fixed storage device such as a hard disk drive (HDD) or a solid state drive (SSD), various input/output (I/O) interfaces, and a network interface that controls connections with a network such as a local area network are connected via a bus, for example. Moreover, the bus may be connected to a disk drive for reading and/or writing data from and/or to a removable disk recording medium such as CD or DVD, a memory reader/writer for reading and/or writing data from and/or to a removable nonvolatile recording medium of various standards, such as a flash memory, or the like via an I/O interface, for example. A program in which the processing contents of the respective functional modules described above is stored in a fixed storage device such as a HDD and installed into the computer via a recording medium such as CD or DVD or a communication unit such as a network. The program stored in the fixed storage device is read onto the RAM and executed by the microprocessor such as the CPU, whereby the group of functional modules described above is realized. Moreover, the tamper-proof module 100 may execute all or a part of the processes of the module using another processor other than the CPU that executes the process of the controller 12.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a data generation unit that generates target data;
   an acquisition unit that acquires feature information of a latest block in a block chain when the target data is generated;
   a data combination unit that generates combined data of the target data and the feature information;
   a signature processing unit that computes a digital signature using a private key with respect to the combined data; and
   a registration unit that registers, to a time proof service, the digital signature as proof information indicating that the generated target data is correlated with the feature information acquired by the acquisition unit when the target data is generated.

2. The information processing apparatus according to claim 1, wherein
   the time proof service registers the proof information registered from the registration unit to the block chain.

3. The information processing apparatus according to claim 1, wherein
   the signature processing unit computes a hash value of the combined data and encrypts the computed hash value using the private key to obtain the digital signature.

4. The information processing apparatus according to claim 1, further comprising
   a unit that generates a new private key according to a user's instruction and sets the new private key to the registration unit as the private key used to compute the digital signature.

5. The information processing apparatus according to claim 1, further comprising
   a feature information storage unit that stores the feature information acquired by the acquisition unit when previous target data is generated as previous feature information, wherein
   the data combination unit generates combined data of the target data generated presently, the feature information acquired by the acquisition unit when the target data is generated, and the previous feature information stored in the feature information storage unit.

6. A non-transitory computer readable medium storing a program causing a computer to execute information processing, the information processing comprising:
   generating target data;
   acquiring feature information of a latest block in a block chain when the target data is generated;
   generating combined data of the target data and the feature information;
   computing a digital signature using a private key with respect to the combined data; and
   registering, to a time proof service, the digital signature as proof information indicating that the generated target data is correlated with the feature information which is acquired when the target data is generated.

7. A non-transitory computer readable medium storing a program causing a computer to execute information processing, the information processing comprising:
   when target data, feature information of a latest block that is acquired from a block chain when the target data is generated, and a digital signature computed from combined data of the target data and the feature information using a private key are obtained,
   acquiring time information of a block corresponding to the feature information from the block chain and that sets the time information to a first time point;
   acquiring time information of a block that includes the digital signature from the block chain and sets the time information to a second time point; and
   presenting information indicating that the target data is generated in a period between the first time point and the second time point.

* * * * *